United States Patent [19]
Arimoto et al.

[11] 3,838,912
[45] Oct. 1, 1974

[54] OPTICAL DEFLECTING APPARATUS
[75] Inventors: Akira Arimoto, Fujisawa; Yoshihiro Onishi, Kokubunji, both of Japan
[73] Assignee: Hitachi, Ltd., Tokyo, Japan
[22] Filed: Oct. 13, 1972
[21] Appl. No.: 297,396

[30] Foreign Application Priority Data
Oct. 15, 1971 Japan.............................. 46-80892

[52] U.S. Cl............. 350/285, 350/DIG. 2, 350/150, 350/157
[51] Int. Cl.............................................. G02f 1/26
[58] Field of Search............ 350/3.5, 150, 247, 157, 350/285, DIG. 2

[56]  References Cited
UNITED STATES PATENTS
3,503,670  3/1970  Kosanke et al................ 350/157 X
3,515,455  6/1970  Kompfner...................... 350/157 X
3,606,522  9/1971  Townes et al................. 350/247 UX Primary Examiner—Ronald L. Wibert
Assistant Examiner—F. L. Evans
Attorney, Agent, or Firm—Craig & Antonelli

[57]  ABSTRACT

In a holograph memory device, an incident beam from a laser source is displaced parallelly by a first optical deflector. This emergent beam from the first optical deflector is then angularly deflected by a second deflector. The emergent beam from the second optical deflector is condensed and focused by a lens to irradiate a desired part of a hologram plate.

13 Claims, 8 Drawing Figures

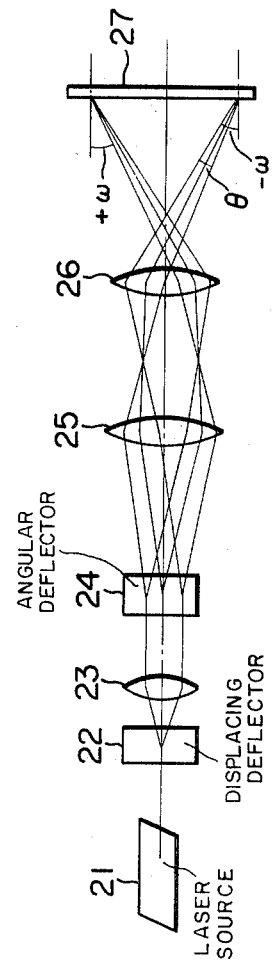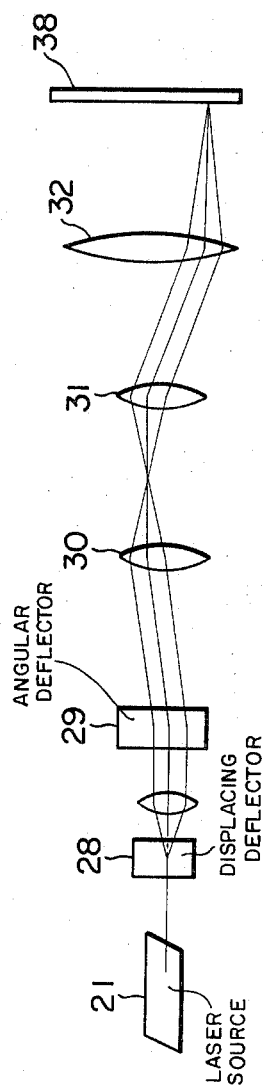

OPTICAL DEFLECTING APPARATUS

BACKGROUND OF THE INVENTION

1. Field of the Invention

This invention relates to an optical deflecting apparatus.

2. Description of the Prior Art

There are roughly two types of functions in optical deflecting apparatus; (1) one for angularly deflecting an incident light beam thereto, and (2) one for parallely displacing the beam thereto. The former type includes a mechanical deflector using a rotating mirror, and a supersonic optical deflector in which supersonic waves are applied to a ferroelectric medium. The latter type includes an electro-optical deflector combining an optical deflecting switch and a birefringence prism. These optical deflectors are used in combination with appropriate optical systems to irradiate a predetermined spot. In conventional optical devices such as a holograph memory, a light beam is kept stationary at the predetermined position in a hologram to fix the reconstructed image of the hologram.

However, in a hologram made of a plane type photorecording material (one having a thickness smaller than the interdistance of interference fringes), when there arises a need for continuously or discretely moving a reconstructed image the reading-out beam on the hologram should be changed in angle with the center position of the beam unmoved. Further, in a hologram made of a volume type photo-recording material (one having a thickness larger than the interdistance of the interference fringes), different kinds of information can be recorded by changing the incidence angle of the light beam, i.e. multiple exposure is possible by the angular selecting property of the interference fringes. In such a case, the incidence angle of the reference beam should be changed to some extent.

SUMMARY OF THE INVENTION

An object of the present invention is to provide an optical deflecting apparatus capable of deflecting a light beam to irradiate a predetermined spot and then changing the incidence angle of the incident beam at said spot by a minute amount.

In the present invention, in the preceding stage of one optical deflector for generating an angular deflection, another optical deflector for parallelly displacing the indicent position of the beam incident on said one optical deflector is used to enable a minute change in the incidence angle at a predetermined spot. The gist of the present invention lies in the fact that the optical deflecting system comprises one optical deflector for parallelly displacing a light beam, another optical deflector disposed in the following stage of said one optical deflector for carrying out an angular deflection, and a focusing optical system disposed in the further following stage so that a light beam having passed through said deflectors is focused at a predetermined position in a light receiving surface and is changed in the incidence angle at said position.

According to one embodiment of the present invention, it becomes possible to first deflect a light beam to a predetermined position in a hologram and then minutely change the incidence angle of the light beam. According to another embodiment of the present invention utilizing an off-set optical system, the incidence angle can be arbitrarily changed. The displacing deflector may be formed of a digital deflector of discrete type or an analog deflector of scanning type.

BRIEF DESCRIPTION OF THE DRAWING

FIGS. 6, 7 and 8 are views showing further embodiments of this invention, respectively.

DESCRIPTION OF THE PREFERRED EMBODIMENT

Figure 1:
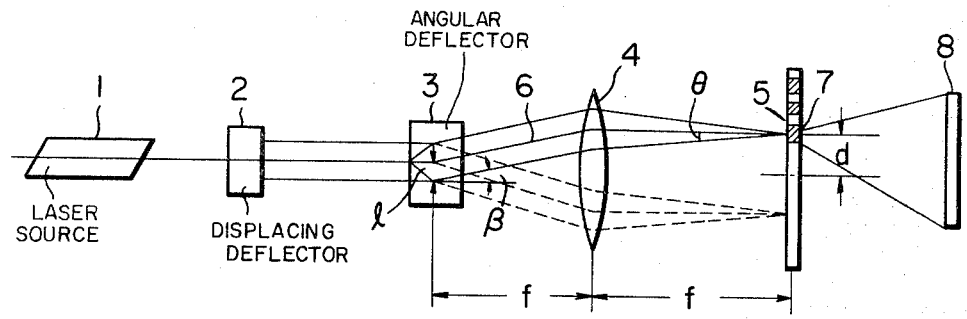
FIG. 1 shows a basic arrangement of a holograph memory according to this invention.

Description will now be made on an embodiment of a holograph memory shown in FIG. 1. In the figure, a laser source 1, an optical deflector 2 for parallelly displacing a light beam disposed in the former stage, and another optical deflector for angularly deflecting a light beam (for example, an ultrasonic optical deflector) are aligned on an imaginary axis. A laser beam emitted from the laser source 1 is subjected to a transverse displacement of a magnitude $l$ by the optical deflector 2 for generating a transverse displacement (for example, an optical deflector comprising the combination of an electro-optical crystal and a birefringent prism). Such deflected beam is then incident on the angular deflector 3 and subjected to an angular change of an angle $\beta$. If the distances between the optical deflector 3 and a focusing lens 4 having a focal length $f$ and between the lens 4 and a hologram plate 5 are respectively selected to be $f$, all the light emitted from the laser source $l$ is focused at a position displaced by $$d = f \tan \beta \approx f \cdot \beta$$

from the optical axis. There, the light beam subjected to a transverse displacement of $l$ is subjected to an incidence angle change of $\theta = l/f$ compared to a light beam 6 not subjected to a transverse displacement. Here, it is to be noted that the focal point 7 does not change in these two cases. Namely, $d$ and $\theta$ are independent from $l$ and $\beta$, respectively. When the incidence angle of a reconstructing beam is changed, the position of the reconstructed image shifts in the case of forming the hologram plate 5 with a thin photosensitive plate. In the case of forming the hologram plate 5 with a thick photosensitive plate, a change in the incidence angle of the reconstructing beam leads to the disappearance of the reconstructed image. Therefore, if recording is made at different angles, various reconstruction images can be obtained by changing the incidence angle of the reconstructing beam. Namely, multiple exposure becomes possible due to the angular selection of the interference fringes as described above, and a large capacity of information can be stored in the same place. Using such a hologram and reading the hologram with said optical deflecting apparatus, multiple information can be successively derived from said one hologram.

Figure 2:
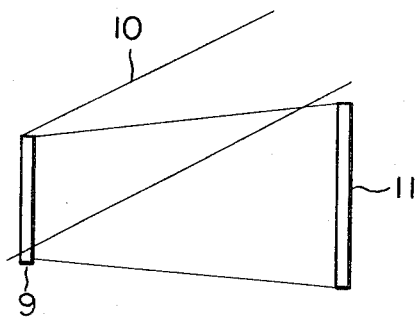
FIG. 2 illustrates the formation of a hologram with a slanted incident reference beam.
Figure 3:
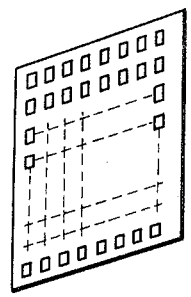
FIG. 3 shows a matrix disposition of holograms.
Figure 4:
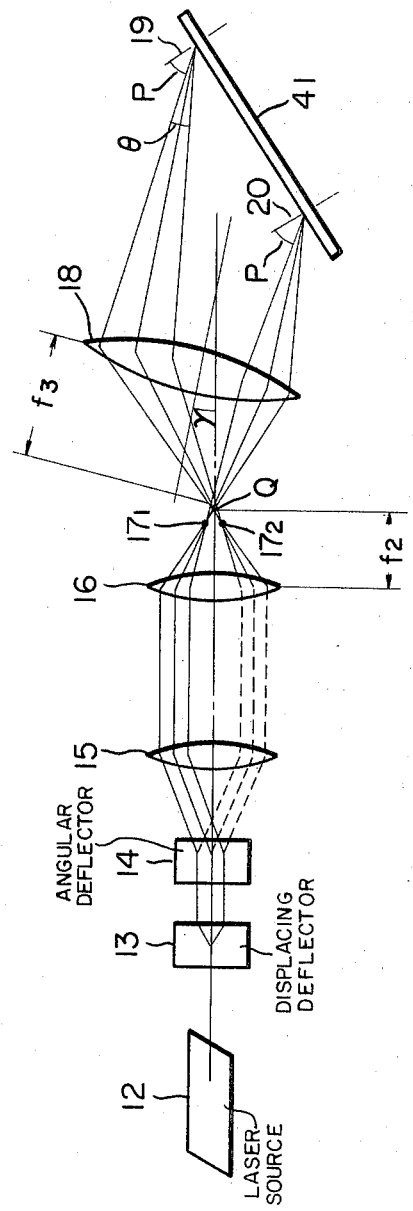
FIG. 4 is a view showing another embodiment of this invention.

Embodiment 1 shown in FIG. 1 utilizes an optical system having symmetry with respect to an optical axis and therefore, a hologram plate 5 having a plurality of holograms made with a perpendicularly incident reference light beam should be disposed perpendicular to the optical axis. However, when as shown in FIG. 2 a hologram 9 is made with a slanted incident reference beam 10 and a multiplicity of such holograms is disposed in a one or two dimensional array as shown in FIG. 3 and is to be read by a single deflecting system, the distance of the focal point 7 from the lens in FIG. 1 should be varied for each access position. Therefore, in the present invention a so-called lens tilting optics in which a lens is slanted with respect to the optical axis is used to provide an optical system for accessing a light beam to a hologram plate, etc. at a predetermined angle. This will be described in detail referring to FIG. 4.

Figure 5:
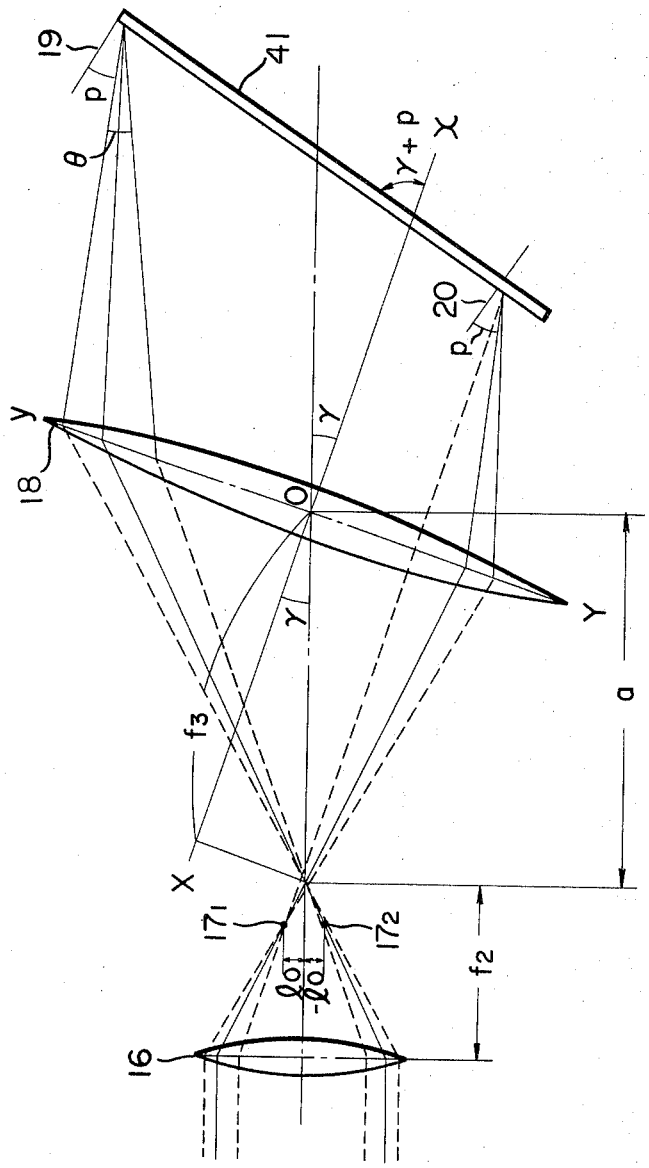
FIG. 5 is a partial elevation of FIG. 4.

A laser beam emitted from a laser source 12 passes through a displacing deflector 13 and impinges on an angular deflector 14. Then, the light beam passes through lenses 15, 16 and 18 and impinges on a hologram plate 41. Here, for rotating the laser beams at positions 19 and 20 in the hologram by a minute angle, the lens 18 may be slanted with respect to the optical axis. Here, it is arranged that the focal planes of the lens 16 (focal length $f_2$) and the lens 18 (focal length $f_3$) cross the optical axis at the same point Q. For directing the laser beam to the hologram at an incidence angle of $p$, the imaging relationship of the lens 18 is utilized. When the lenses 15 and 16 are appropriately disposed, light beams deflected by the displacing deflector are respectively once focused at points $17_1$ and $17_2$. The imaging relation between these points $17_1$ and $17_2$ in front of the lens and the points 19 and 20 on the back of the lens is utilized in this invention. The portion including the lenses 16 and 18 is enlarged in FIG. 5. The slanting angle of the lens 18 is indicated by $\gamma$, and $a$ and $lo$ are taken as shown in the figure. The point $17_1$ exists at a point ($a \cos \gamma + lo \sin \gamma$, $a \sin \gamma - lo \cos \gamma$)

in (X. Y) coordinate, and the point $17_2$ exists at a point ($a \cos \gamma - lo \sin \gamma$, $a \sin \gamma + lo \cos \gamma$).

The coordinate ($x_{20}$, $y_{20}$) of the image point 20 corresponding to the point $17_1$ is in ($x$, $y$) coordinate $x_{20} = (a \cos \gamma + l_o \sin \gamma) f_3/a \cos \gamma + l_o \sin \gamma - f_2$ $y_{20} = f_3 (a \sin \gamma - lo \cos \gamma)/(a \cos \gamma + lo \sin \gamma - f_3)$ Similarly, the coordinate of the point 19, ($x_{19}$, $y_{19}$) is $x_{19} = (a \cos \gamma - lo \sin \gamma) f_3/a \cos \gamma - lo \sin \gamma - f_3$ $y_{19} = (a \sin \gamma + lo \cos \gamma) f_3/a \cos \gamma - lo \sin \gamma - f_3$ For letting a laser beam be directed to the hologram at an angle $p$, the values of $\gamma$, $p$, $f_3$ and $a$ may be appropriately selected to satisfy tan ($\gamma + p$) = (the angle of the hologram plate 41 with respect to $x$ axis) = $y_{20} - y_{10}/x_{20} - x_{10}$ As an example if $p = 45°$, then $a = f_3 / (\cos \gamma - \sin \gamma)$ and when $\gamma$ is very small with respect to 1, $a = f_3 / (1 - \gamma)$.

Thus, a light beam can be directed to a hologram at an arbitrary angle and be minutely varied in its incidence angle by varying the slanting angle $\gamma$ of the lens 18.

Now, a further embodiment will be described.

Embodiment 3 (FIG. 6)

The optical deflector portion is same as that of the embodiment 1, but the incidence angle for the hologram is arranged to vary between $-\omega$ and $=\omega$ by the combination of lens systems 25 and 26. Numeral 22 indicates an angular deflector which generates a displacement of a laser beam in the combination with lens 23.

Embodiment 4 (FIG. 7)

Lenses 31 and 32 are arranged in afocal disposition. The front focal point of a lens 30 is placed at the deflection point of the X − Y deflector, and the light beam emerging from the lens 32 becomes parallel to the optical axis and perpendicularly impinges on the hologram plate.

The lenses 30 and 31 are further arranged in afocal disposition and a hologram plate is placed at the back focal position of the lens 32. The change in the incidence angle at the hologram plate is given by $$l\, f_2/f_1\, f_3$$

where, $l$ represents displacement in the deflector 28, and $f_1$, $f_2$ and $f_3$ focal lengths of the lenses 30, 31 and 32. Namely, the incidence angle can be changed in correspondence with the displacement $l$ in the deflector 28.

Figure 8:
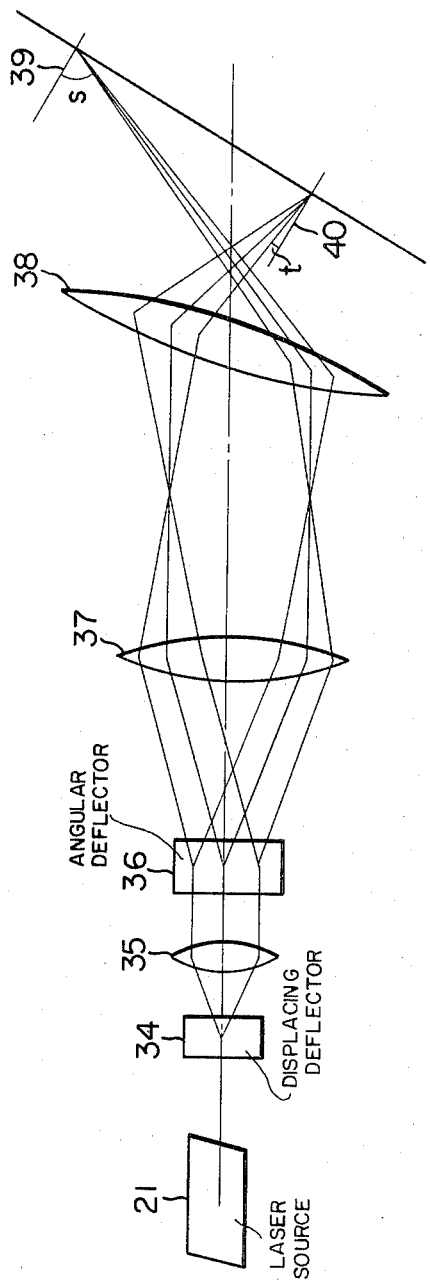

Embodiment 5 (FIG. 8)

This is an addition of a tilted lens system to the lens 26 in the optical system of the embodiment 3. Namely, the incidence angle of a light beam is varied in the range from $-t°$ to $+S°$ by a lens 38 slanted with respect to the optical axis, and further can be given a minute angle variation in that neighborhood.

We claim:

1. An optical deflecting apparatus capable of changing an angle of incidence of an incident light beam upon a predetermined receiving point comprising:
   a light source generating a light beam along a first direction;
   a first optical deflector for displacing said light beam in a direction transverse to said first direction so that said beam travels in a direction which is parallel to said first direction;
   a second optical deflector, arranged in the path of the beam emerging from said first optical deflector, for deflecting angularly said emerging light beam from said first optical deflector;
   a light collecting system, arranged in the path of the beam emerging from said second optical deflector, for focussing said emerging light beam from said second optical deflector at a desired point, said desired point being defined by the angular deflection of light beam carried out by said second optical deflector; and
   a light receiving material, arranged in the path of the beam emerging from said light collecting system, for receiving said focussed beam whereby the incident angle of said focussed beam on said desired point in said material may be changed by means of said first optical deflector.

2. An optical deflecting apparatus according to claim 1, wherein said light collecting system is made of a lens tilting optics.

3. An optical deflecting apparatus comprising:
   first means, disposed in the path of a beam of light travelling along a first direction, for displacing said beam of light in a direction transverse to said first direction, so that said beam of light emerges from said first means travelling along a path in parallel to said first direction, but displaced from the path along which it was travelling prior to its incidence upon said first means;

second means, disposed in the path of the displaced beam emerging from said first means, for deflecting said displaced beam at an angle relative to said path in parallel to said first direction; and third means, disposed to receive the angularly deflected beam emerging from said second means, for focussing said angularly deflected beam at a prescribed point.

4. An optical deflecting apparatus according to claim 3, wherein said first and second means are coaxially disposed in the path of said beam and said prescribed point is transversely displaceable relative to said path.

5. An optical deflecting apparatus according to claim 3, wherein said third means comprises a lens, the respective focal planes of which are disposed at the position of said second means and said prescribed point.

6. An optical deflecting apparatus comprising:

first means, disposed in the path of a first beam of light travelling in a first direction along a first optical path, for separating said first beam of light into a plurality of beams of light each travelling in a separate parallel path in said first direction and displaced from each other transversely with respect to said first direction;

second means, disposed to receive said plurality of parallel beams of light from said first means, for deflecting said beams at an angle relative to said first direction; and third means, disposed to receive the plurality of beams angularly deflected by said second means, for focussing said beams at a selected point.

7. An optical deflecting apparatus according to claim 6, wherein said first and second means are coaxially disposed in the path of said first beam of light and said selected point is transversely displaceable relative to said path.

8. An optical deflecting apparatus according to claim 6, wherein said third means comprises means for focussing said plurality of beams at respective points disposed in a plane inclined at an acute angle relative to said first direction.

9. An optical deflecting apparatus according to claim 8, wherein said third means includes a lens tilted at an acute angle relative to said first direction.

10. An optical deflecting apparatus according to claim 9, wherein said third means further includes a collimating lens, receiving said angularly deflected beams, for collimating said beams in parallel directions, and a converging lens for converging the collimated beams, the rear focal plane thereof intersecting the front focal point of said tilted lens.

11. An optical deflecting apparatus according to claim 6, wherein said third means comprises a pair of lenses disposed optically in series between said second means and said selected point.

12. An optical deflecting apparatus according to claim 6, wherein said third means comprises an afocal lens system disposed between said second means and said selected point.

13. An optical deflecting apparatus according to claim 11, wherein one of said lenses of said pair is tilted at an angle relative to said first direction.

* * * * *